May 29, 1934. J. N. MOORE 1,960,450

GLARE SHIELD

Original Filed July 2, 1931

Inventor

Joseph N. Moore

By Clarence A. O'Brien
Attorney

Patented May 29, 1934

1,960,450

UNITED STATES PATENT OFFICE 1,960,450

GLARE SHIELD

Joseph N. Moore, Portsmouth, Va.

Substitute for abandoned application Serial No. 548,457, July 2, 1931. This application June 21, 1933, Serial No. 676,974

4 Claims. (Cl. 2—12)

This application is a substitute for my forfeited and abandoned application Serial No. 548,457 filed July 2, 1931.

The present invention relates to glare shields particularly for use by motorists for protecting the eyes from approaching headlights or from the sun and has for one of its important objects to provide a glare shield which is permanently mounted upon or which may be attached to a pair of eye glasses for use.

Another important object of the invention is to provide, in a manner as hereinafter set forth, a glare shield of the character described embodying a novel construction, combination and arrangement of parts whereby the shield elements may be expeditiously adjusted as desired to meet various conditions.

Other objects of the invention are to provide glare shields of the aforementioned character which will be simple in construction, strong, durable, efficient and reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1:
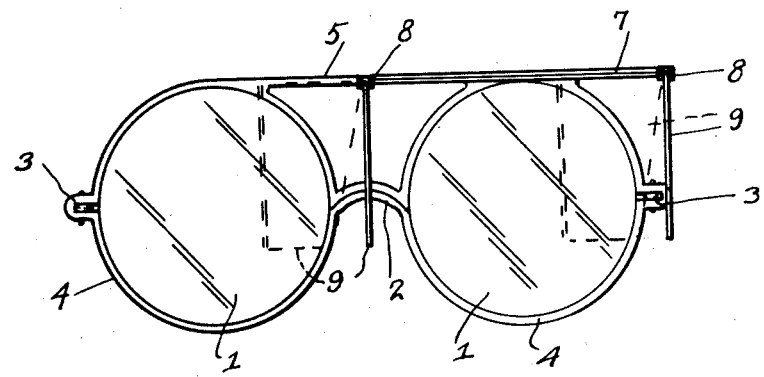
Figure 1 is a view in front elevation showing a pair of eye glasses equipped with this invention.

In the embodiment of the invention illustrated for exemplification in the drawing, it will be seen that the reference numeral 1 designates a pair of lenses mounted in the annular frames which are formed to provide the connecting nose engaging bridge 2. The reference numeral 3 designates a pair of ear engaging bows which are pivotally connected, at one end, to the annular frames, said frames being designated by the reference numeral 4.

Formed integrally with the annular frames 4 and extending thereacross and projecting laterally and outwardly from one of said frames is a bar 5. Pivotally mounted for swinging movement in a horizontal plane at spaced points on the bar 5 are the arms 6 which are coupled together for operation in unison by a connecting rod 7, the ends of said connecting rod being pivotally connected to intermediate portions of the arms 6.

Bars 8 are rotatably mounted on the arms 6 and extend longitudinally therefrom and have mounted thereon and depending therefrom the translucent sheets or plates 9. As best seen in Figure 1 of the drawing, one of the sheets or plates 9 is disposed forwardly of the bridge 2 intermediate the lenses 1 of the eye glasses while the other of the translucent sheets or plates is disposed forwardly and laterally of one of the lenses 1.

Figure 2:
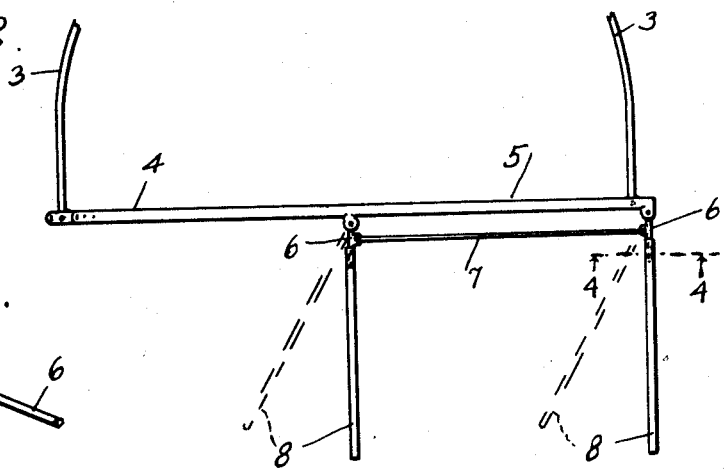
Figure 2 is a view in top plan thereof.
Figure 5:
Figure 5 is a detail view in perspective showing one of the shield supporting arms.
Figure 3:
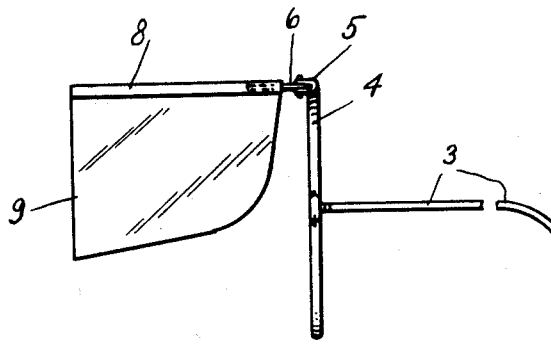
Figure 3 is a view in side elevation.
Figure 4:
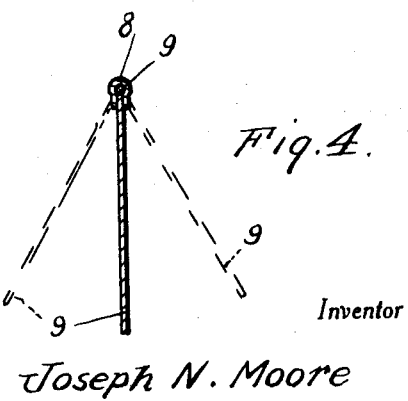
Figure 4 is a vertical sectional view taken substantially on the line 4—4 of Figure 2.

It will thus be seen that the translucent sheets or lenses 9 may be adjusted by swinging the same in a horizontal plane on the bar 5 or they may be adjusted by rotating the same about the arms 6. This is indicated in broken lines in Figures 1, 2 and 4 of the drawing. In this manner, the elements 9 may be adjusted as desired to protect the eyes from the glare of approaching headlights or from the sun.

It is believed that the many advantages of a glare shield constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A glare shield comprising a bar, means for supporting the bar transversely above the eyes of a wearer, a pair of arms pivotally mounted, at spaced points, on the bar for swinging movement in a horizontal plane, means connecting the arms together for movement in unison, in the same direction, tubular extensions frictionally mounted on the arms for rotary adjustment and translucent sheets carried by the extensions and disposed for adjustment forwardly and to one side of each of the eyes of the wearer.

2. A glare shield comprising a bar, means for supporting the bar transversely above the eyes of a wearer, a pair of arms pivotally mounted at spaced points, on the bar for swinging movement in a horizontal plane, and translucent sheets mounted for swinging movement in a vertical plane on the arms and adjustably disposed forwardly and to one side of the eyes of the wearer.

3. A glare shield comprising a bar, means for supporting the bar transversely above the eyes of a wearer, a pair of arms pivotally mounted, at spaced points, on the bar for swinging movement in a horizontal plane, a rod coupling the arms together for swinging movement in unison, and translucent sheets mounted on the arms for swinging movement in a vertical plane and disposed for adjustment forwardly of and to one side of each of the eyes of the wearer.

4. In a glare shield comprising a bar, means for supporting the bar transversely above the eyes of a wearer, a pair of arms pivotally mounted, at spaced points, on the bar for swinging movement in a horizontal plane, a rod connecting the arms together for movement in unison, bars rotatably mounted on the arms and extending longitudinally therefrom, and translucent sheets mounted on the arms and disposed for adjustment forwardly of and to one side of each of the eyes of the wearer.

JOSEPH N. MOORE.